United States Patent
Bian et al.

(10) Patent No.: US 11,295,516 B2
(45) Date of Patent: Apr. 5, 2022

(54) RECONSTRUCTION METHOD, RECONSTRUCTION DEVICE, AND GENERATION METHOD FOR GENERATING A THREE-DIMENSIONAL (3D) MODEL

(71) Applicant: Panasonic Intellectual Property Corporation of America, Torrance, CA (US)

(72) Inventors: Zhen Peng Bian, Singapore (SG); Pongsak Lasang, Singapore (SG); Toshiyasu Sugio, Osaka (JP); Toru Matsunobu, Osaka (JP); Satoshi Yoshikawa, Hyogo (JP); Tatsuya Koyama, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 100 days.

(21) Appl. No.: 16/828,036

(22) Filed: Mar. 24, 2020

(65) Prior Publication Data

US 2020/0226825 A1 Jul. 16, 2020

Related U.S. Application Data

(63) Continuation of application No. PCT/JP2018/035194, filed on Sep. 21, 2018.
(Continued)

(51) Int. Cl.
*G06T 17/00* (2006.01)
*G06T 3/40* (2006.01)
*G06T 7/55* (2017.01)

(52) U.S. Cl.
CPC ............... *G06T 17/00* (2013.01); *G06T 3/40* (2013.01); *G06T 7/55* (2017.01); *G06T 2200/08* (2013.01)

(58) Field of Classification Search
None
See application file for complete search history.

(56) References Cited

U.S. PATENT DOCUMENTS

| 8,331,615 B2 | 12/2012 | Furukawa et al. |
| 9,070,216 B2 * | 6/2015 | Golparvar-Fard .......................... G06Q 10/06311 |

(Continued)

OTHER PUBLICATIONS

International Search Report (ISR) dated Dec. 25, 2018 in International (PCT) Application No. PCT/JP2018/035194, with English Translation.

(Continued)

*Primary Examiner* — Michael J Cobb
(74) *Attorney, Agent, or Firm* — Wenderoth, Lind & Ponack, L.L.P.

(57) ABSTRACT

A generation method is disclosed. Two-dimensional (2D) images that are generated by photographing a space from different viewpoints with at least one camera are obtained. Resolutions of the 2D images are reduced to generate first images, respectively. Second images are generated from the 2D images, respectively such that a resolution of each of the second images is higher than a resolution of any one of the first images. First three-dimensional (3D) points are generated based on the first images. The first 3D points indicate respective first positions in the space. A second 3D point is generated based on the second images. The second 3D point indicates a second position in the space. A 3D model of the space is generated based on the first 3D points and the second 3D point.

9 Claims, 16 Drawing Sheets

Related U.S. Application Data

(60) Provisional application No. 62/563,239, filed on Sep. 26, 2017.

(56) References Cited

U.S. PATENT DOCUMENTS

| | | | |
|---|---|---|---|
| 10,529,086 B2* | 1/2020 | Jiang | G06T 17/20 |
| 11,062,502 B2* | 7/2021 | Saragih | G06T 15/08 |
| 2019/0128670 A1* | 5/2019 | Chen | G06T 17/00 |
| 2021/0142497 A1* | 5/2021 | Pugh | G06T 7/194 |

OTHER PUBLICATIONS

R. Hartley et al., "Multiple View Geometry in Computer Vision", $2^{nd}$ Edition, Cambridge University Press, 2003, pp. 1-14.

* cited by examiner

FIG. 14

| METHODS | TOTAL PROCESSING TIME (SECONDS) | NUMBER OF POINTS IN 3D POINT CLOUD RECONSTRUCTED | PROCESSING TIME PER POINT (MILLISECONDS) |
|---|---|---|---|
| COMPARATIVE EXAMPLE 1 LOW-RESOLUTION IMAGES (1/8) | T | X | P |
| COMPARATIVE EXAMPLE 2 HIGH-RESOLUTION IMAGES (1/2) | 15T | 14X | P |
| WORKING EXAMPLE (1/16 ⇒ 1/2) | 10T | 15X | 0.7P |

CAMERA LAYOUT EXAMPLE
OF STANDALONE CAMERAS

CAMERA LAYOUT EXAMPLE
INCLUDING CAMERA GROUP

RECONSTRUCTION METHOD, RECONSTRUCTION DEVICE, AND GENERATION METHOD FOR GENERATING A THREE-DIMENSIONAL (3D) MODEL

CROSS REFERENCE TO RELATED APPLICATIONS

This application is a U.S. continuation application of PCT International Patent Application Number PCT/JP2018/035194 filed on Sep. 21, 2018, claiming the benefit of priority of U.S. Provisional Patent Application No. 62/563,239 filed on Sep. 26, 2017, the entire contents of which are hereby incorporated by reference.

BACKGROUND

1. Technical Field

The present disclosure relates to a reconstruction method, a reconstruction device, and a generation method.

2. Description of the Related Art

U.S. Pat. No. 8,331,615 B2 (Patent Literature 1) discloses a three-dimensional (3D) reconstruction method in which multi-view stereopsis for reconstructing a 3D model of an object from a plurality of images is used.

SUMMARY

According to one aspect of the present disclosure, a generation method is disclosed. Two-dimensional (2D) images that are generated by photographing a space from different viewpoints with at least one camera are obtained. Resolutions of the 2D images are reduced to generate first images, respectively. Second images are generated from the 2D images, respectively such that a resolution of each of the second images is higher than a resolution of any one of the first images. First three-dimensional (3D) points are generated based on the first images. The first 3D points indicate respective first positions in the space. A second 3D point is generated based on the second images. The second 3D point indicates a second position in the space. A 3D model of the space is generated based on the first 3D points and the second 3D point.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 14 is a diagram illustrating an example of the comparison results of processing time and the number of reconstructed 3D points;

Figure 1:
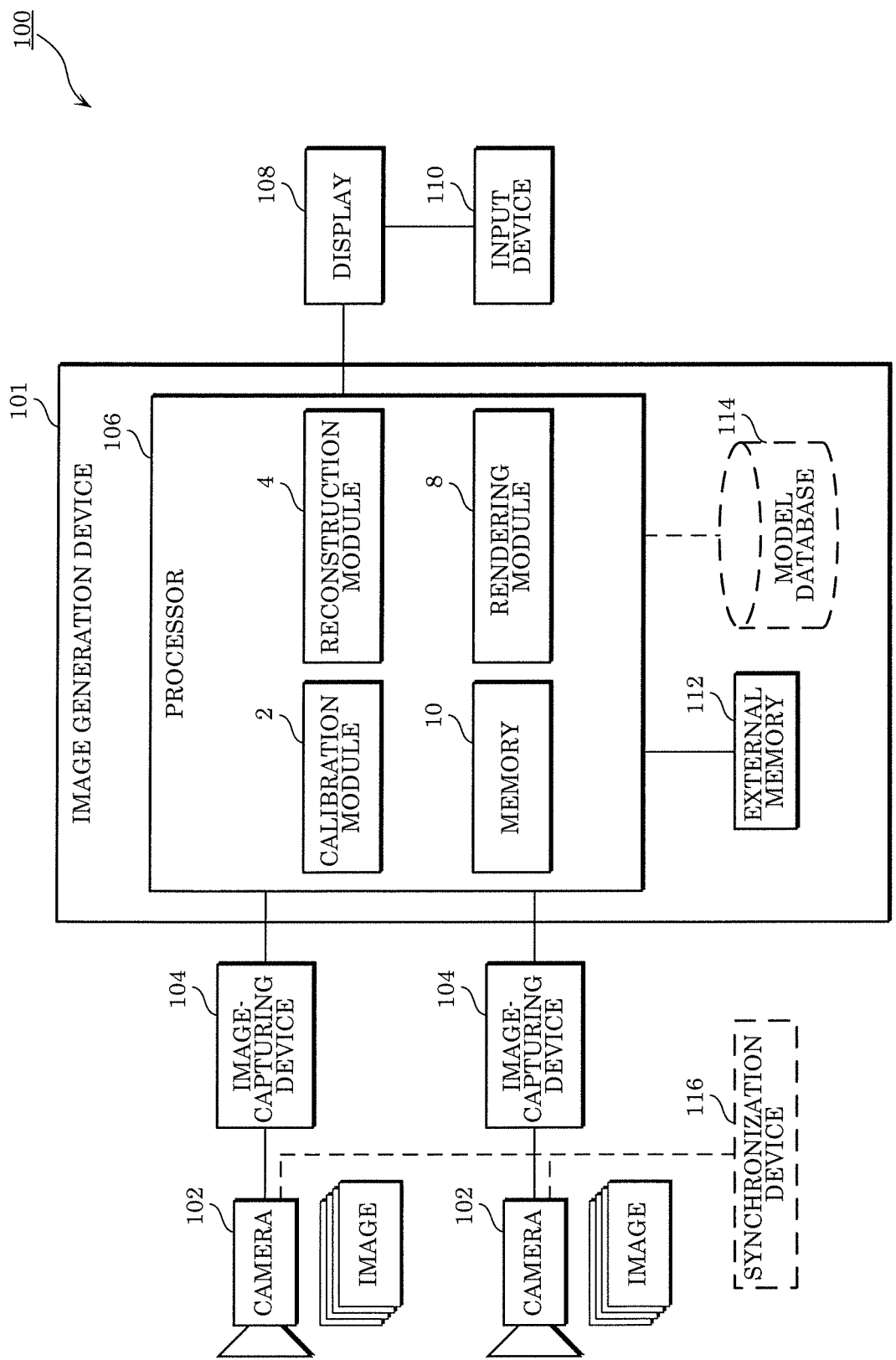
FIG. 1 is a block diagram illustrating an example of the configuration of an image generation system according to an embodiment.

DETAILED DESCRIPTION OF THE EMBODIMENT (Underlying Knowledge Forming Basis of the Present Disclosure)

Three-dimensional (3D) reconstruction in the field of computer vision refers to the techniques for recovering a 3D model of a scene from two-dimensional (2D) images obtained by capturing the scene from a plurality of viewpoints. With 2D images and camera parameters including internal and external parameters of cameras, it is possible to obtain a 3D model on the basis of the correlation between two or more 2D images. General techniques for 3D reconstruction from a plurality of views are described, for example, in R. Hartley and A. Zisserman (2003), "*Multiple View Geometry in Computer Vision*", 2$^{nd}$ Edition (Non Patent Literature 1). Several improvement techniques have also been developed.

For example, Patent Literature 1 discloses the 3D reconstruction method in which the multi-view stereopsis for reconstructing a 3D model of an object from a plurality of images is used. In this 3D reconstruction method, a sparse 3D point cloud is obtained by finding a matching pair of feature points across a plurality of images of an object. The sparse 3D point cloud is extended to obtain a dense 3D point cloud for the object.

The 3D model of a real scene reconstructed by a 3D reconstruction method such as that of the related art can be used in various applications, for example, free viewpoint video rendering, virtual reality, or augmented reality (VR/AR). The quality of these applications is highly dependent on the accuracy and density of the reconstructed 3D model. Therefore, an accurate and dense 3D reconstruction process is required to provide high-quality applications.

However, conventional 3D reconstruction methods have a problem in being still low in accuracy, resulting in a 3D model with insufficient density. In order to obtain a denser 3D model, images with higher resolution are used for 3D reconstruction in conventional methods such as that in Patent Literature 1. With such an approach, it is possible to obtain a 3D model of a denser 3D point cloud for a rich texture area, but a noisy 3D point cloud tends to be reconstructed, causing the problem of long processing time. It is common knowledge that 3D reconstruction is to be performed on low-resolution images to reduce processing time. There is, however, still a problem in that the 3D model reconstructed in this manner has low density.

In short, a problem with the conventional approach is that the process of reconstructing a dense 3D model is time-consuming.

A three-dimensional (3D) reconstruction method according to one aspect of the present disclosure is for reconstructing a three-dimensional (3D) model using a plurality of two-dimensional (2D) images obtained by a plurality of cameras disposed in different positions and attitudes capturing a same target space in a 3D space. The 3D reconstruction method includes: converting the plurality of 2D images into a plurality of first low-resolution images having a resolution lower than a resolution of the plurality of 2D images; reconstructing, using the plurality of first low-resolution images, a first 3D point cloud including a plurality of 3D points; generating a second 3D point cloud including 3D points increased by adding a new 3D point to the first 3D point cloud using a plurality of high-resolution images obtained based on the plurality of 2D images and having a resolution higher than the resolution of the plurality of first low-resolution images; and reconstructing the 3D model using the second 3D point cloud.

Thus, the plurality of images are down-sampled first, and the plurality of obtained low-resolution images are used in the process of reconstructing the 3D point cloud. This allows a reduction in the processing load in the reconstruction process; therefore, the generated 3D point has less noise. Furthermore, in order to improve accuracy, the process of increasing, using high-resolution images having a resolution higher than the resolution of the low-resolution images, 3D points included in a sparse 3D point cloud generated from the low-resolution images is performed. Thus, with the use of the high-resolution images, corresponding textures of the images can be specified accurately and, accordingly, the matching accuracy can be improved, leading to improvement in the accuracy of the 3D point cloud.

Furthermore, the reconstruction method may further include: determining whether or not a predetermined condition is satisfied; repeating, when determining that the predetermined condition is not satisfied, the conversion and the reconstruction of the first 3D point cloud until the predetermined condition is satisfied; converting the plurality of 2D images into a plurality of second low-resolution images having a resolution different from the resolution of the plurality of first low-resolution images obtained in a last round of conversion in the conversion that is repeated; and reconstructing a first 3D point cloud including a plurality of 3D points using the plurality of second low-resolution images in the reconstruction of the first 3D point cloud that is repeated.

Thus, the number of 3D points in the 3D point cloud to be output or the density of the 3D point cloud to be output can be changed according to the purpose.

Furthermore, the plurality of second low-resolution images obtained in the conversion that is repeated may have a resolution higher than the resolution of the plurality of first low-resolution images.

Furthermore, the predetermined condition may be that a total number of 3D points included in an obtained 3D point cloud exceeds a predetermined number.

Note that the aforementioned general or specific aspects may be implemented using a system, a method, an integrated circuit, a computer program, or a computer-readable recording medium such as a CD-ROM, or any combination of systems, methods, integrated circuits, computer programs, or recording media.

Hereinafter, a 3D reconstruction method and a 3D reconstruction device according to one aspect of the present disclosure will be specifically described with reference to the drawings.

Note that the embodiment described below shows a specific example of the present disclosure. The numerical values, shapes, materials, structural elements, and the arrangement and connection of the structural elements, steps, the processing order of the steps etc., shown in the following embodiment are mere examples, and are not intended to limit the present disclosure. Accordingly, among the structural elements in the following embodiment, structural elements not recited in any one of the independent claims which indicate the broadest concepts will be described as arbitrary structural elements.

Embodiment

An image generation system according to an embodiment will be described.

FIG. 1 is a block diagram illustrating an example of the configuration of the image generation system according to the embodiment.

As illustrated in FIG. 1, image generation system 100 includes a plurality of cameras 102, a plurality of image-capturing devices 104 connected to corresponding ones of the plurality of cameras 102, image generation device 101, display 108, and input device 110. Image generation system 100 may further include synchronization device 116.

The plurality of cameras 102 are disposed in different positions and secured in different attitudes, and capture images of the same target space in a 3D space. This allows the plurality of cameras 102 to obtain a plurality of images captured from different viewpoints in different viewing directions. The plurality of cameras 102 may obtain the plurality of images by capturing each image with a different timing. The plurality of cameras 102 may be cameras that capture moving images including a plurality of frames as the plurality of images at a predetermined frame rate, for example. The timings of image-capturing by the plurality of cameras 102 may be synchronized by synchronization device 116. Note that although image generation system 100 in FIG. 1 includes two cameras 102, image generation system 100 may include two or more cameras 102.

The plurality of image-capturing devices 104 are provided corresponding to the plurality of cameras 102, respectively, store images captured by the plurality of cameras 102, and output the stored images to processor 106. Note that the plurality of image-capturing devices 104 may be embedded in the plurality of cameras 102. In other words, each of the plurality of cameras 102 may include image-capturing device 104.

Image generation device 101 includes processor 106, external memory 112, and model database 114. Processor 106 includes calibration module 2, reconstruction module 4, rendering module 8, and memory 10.

Calibration module 2 obtains respective camera parameters of the plurality of cameras 102 by performing calibration of the plurality of cameras 102. The camera parameters include: external parameters indicating the position and the attitude of a camera in a 3D space; and internal parameters indicating optical properties such as the focal length, the aberration, and the image center of the camera. The calibration method may be performed using the structure from motion (SFM) technique or may be performed according to a known calibration pattern, for example. The calibration process may be performed at once or may be performed gradually in order to address a change in setup or movement.

Reconstruction module 4 reconstructs a dense, accurate 3D model using a plurality of 2D images captured by the plurality of cameras 102 and the respective camera parameters of the plurality of cameras 102. The 3D model is not limited to that obtained in the manner just described and may also be obtained using sensing data from sensors involving a time-of-flight (ToF) camera, light detection and ranging (LIDAR), a laser scanner, sonar, etc.

Rendering module 8 renders or generates a virtual image of a 3D scene using the 3D model reconstructed by reconstruction module 4 and the plurality of images obtained from the plurality of cameras 102. Rendering module 8 outputs the rendered or generated virtual image to display 108. The virtual image is a 2D image of a target space in a 3D space the images of which are to be captured by the plurality of cameras 102, viewed from a virtual viewpoint different from the viewpoints of the plurality of cameras 102.

Calibration module 2, reconstruction module 4, and rendering module 8 of processor 106 may each be implemented as a general purpose processor executing a program or may each be implemented using a dedicated circuit. In other words, these modules may be implemented with software or may be implemented with hardware.

Memory 10 may temporarily store intermediate data generated in each process performed by calibration module 2, reconstruction module 4, and rendering module 8.

Display 108 connected to processor 106 displays the virtual image output by rendering module 8. In other words, display 108 is a device that displays an image output from processor 106 and is provided, for example, in the form of a liquid-crystal display, an organic electroluminescent (EL) display, or the like. The image output from processor 106 may include a graphical user interface (GUI) for receiving an input.

Input device 110 is connected to display 108, receives, from a user, an input that indicates a virtual viewpoint desired by the user, and outputs, to display 108, an input signal indicating the received input. Input device 110 is implemented, for example, in the form of a remote controller, a gamepad, a mouse, a keyboard, and the like.

Note that when receiving the input signal, display 108 may switch display to a virtual image corresponding to the input signal among the plurality of virtual images viewed from the plurality of virtual viewpoints that have been received from processor 106.

Furthermore, when display 108 has not received from processor 106 the plurality of virtual images viewed from the plurality of viewpoints, display 108 may transmit the input signal to processor 106. In this case, processor 106 generates a virtual image that is viewed from a viewpoint corresponding to the received input signal, and outputs the generated virtual image to display 108. Subsequently, display 108 displays the virtual image output from processor 106. In this case, input device 110, which does not need to be connected to display 108, may be directly connected to processor 106 and configured to transmit the input signal to processor 106.

Note that the connection described with reference to FIG. 1 is for communication and does not need to be wired electrical connection and may be wireless connection. In other words, the connection may be wired connection for communication or may be wireless connection for communication.

External memory 112 may store, for example, information required by processor 106 such as a program. External memory 112 may store data resulting from processing of processor 106.

Model database 114 stores a pre-generated model of a scene for use in reconstruction module 4 or rendering module 8.

Figure 2:
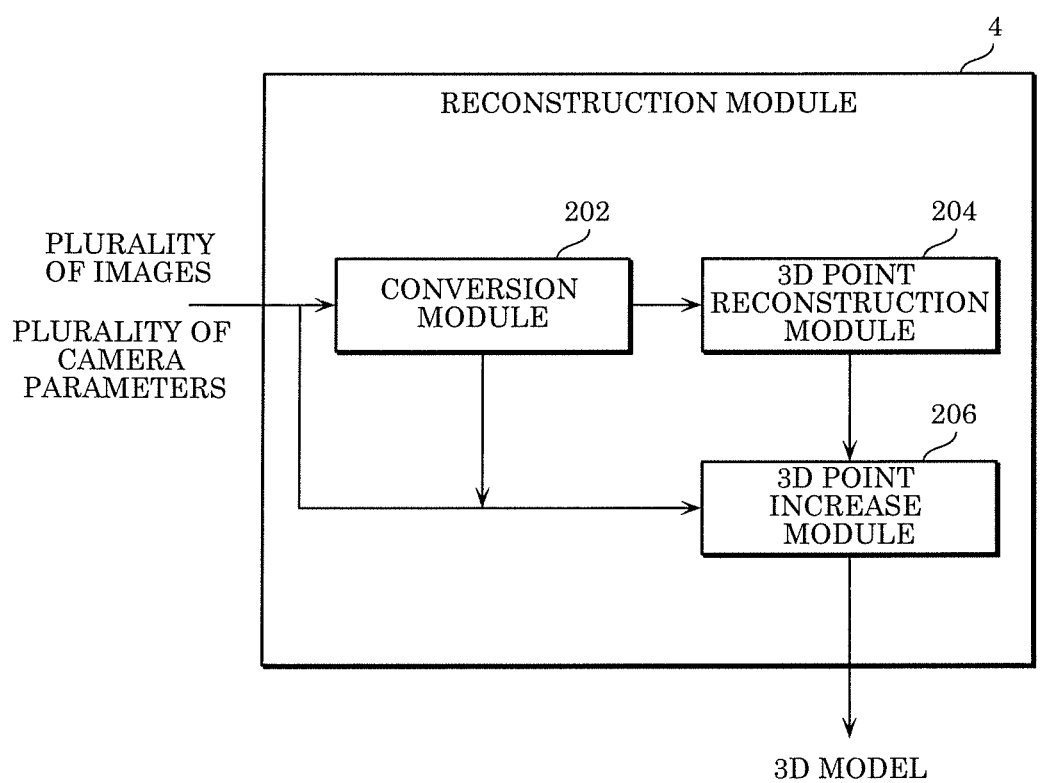
FIG. 2 is a block diagram illustrating an example of processing blocks of a reconstruction module according to an embodiment.

FIG. 2 is a block diagram illustrating an example of processing blocks of the reconstruction module according to the embodiment.

Reconstruction module 4 includes conversion module 202, 3D point reconstruction module 204, and 3D point increase module 206. Three-dimensional point reconstruction module 204 obtains a plurality of images captured by the plurality of cameras 102 and a plurality of camera parameters in one-to-one correspondence with the plurality of cameras 102. The plurality of images and the plurality of camera parameters that have been obtained are input to conversion module 202 and 3D increase module 206. Note that each of the plurality of images obtained by reconstruction module 4, in other words, each of the plurality of images captured by the plurality of cameras 102, is a 2D image.

Conversion module 202 converts the plurality of images into a plurality of first low-resolution images having a resolution lower than the resolution of the plurality of images. Conversion module 202 may obtain the plurality of first low-resolution images by down-sampling the plurality of images, for example. Furthermore, conversion module 202 converts the plurality of camera parameters into a plurality of first converted camera parameters along with the conversion of the plurality of images into the plurality of first low-resolution images. Conversion module 202 may obtain the plurality of first converted camera parameters by down-sampling the plurality of camera parameters, for example.

Here, down-sampling is an example of the process of converting an image into a low-resolution image and the process of converting a camera parameter along with the process of converting the image into the low-resolution image.

Note that conversion module 202 may convert the plurality of images and the plurality of camera parameters at different conversion rates. Specifically, conversion module 202 may convert a plurality of images and a plurality of camera parameters at a first conversion rate, and convert a plurality of images and a plurality of camera parameters at a second conversion rate different from the first conversion rate. In this case conversion module 202 outputs a plurality of first low-resolution images and a plurality of first converted camera parameters resulting from the conversion at the first conversion rate and a plurality of second low-resolution images and a plurality of second converted camera parameters resulting from the conversion at the second conversion rate. Hereinafter, assume that the second conversion rate is less than the first conversion rate. Conversion module 202 may obtain a plurality of high-resolution images having a resolution higher than the resolution of the plurality of first low-resolution images and a plurality of third converted camera parameters by converting a plurality of images and a plurality of camera parameters at a third conversion rate greater than the first conversion rate.

Conversion module 202 outputs, to 3D point reconstruction module 204 and 3D point increase module 206, the plurality of first low-resolution images and the plurality of converted camera parameters that have been obtained. Conversion module 202 may skip converting a plurality of input images and a plurality of input camera parameters and output, to 3D point increase module 206, the plurality of images and the plurality of camera parameters that have not been changed.

Using the plurality of first low-resolution images and the plurality of converted camera parameters resulting from the conversion in conversion module 202, 3D point reconstruction module 204 reconstructs a first 3D point cloud including a plurality of 3D points. Three-dimensional point reconstruction module 204 outputs the obtained 3D point cloud to 3D point increase module 206.

Three-dimensional point increase module 206 adds a new 3D point to the first 3D point cloud using high-resolution images obtained based on a plurality of 2D images and having a resolution higher than the resolution of the plurality of first low-resolution images. With this, 3D point increase module 206 generates a second 3D point cloud including a plurality of dense 3D points resulting from the addition of the 3D point. Using the second 3D point cloud that has been obtained, 3D point increase module 206 reconstructs a 3D model.

Note that the modules included in reconstruction module 4 are each implemented as a general purpose processor executing a program, but this is not limiting; these modules may each be implemented using a dedicated circuit. In other words, these modules may be implemented with software or may be implemented with hardware.

Figure 3:
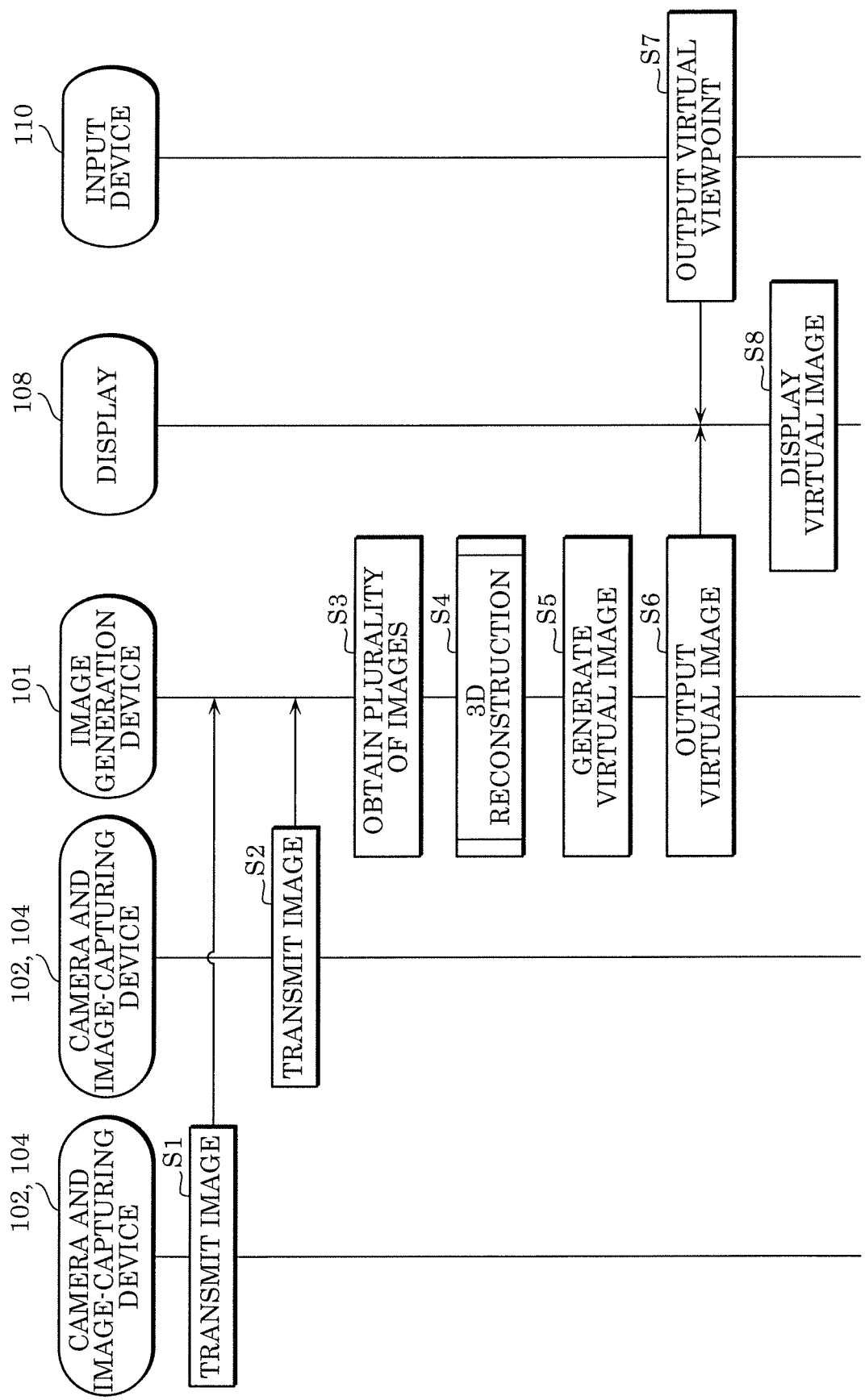
FIG. 3 is a sequence diagram illustrating an example of operations performed by an image generation system according to an embodiment.

FIG. 3 is a sequence diagram illustrating an example of operations performed by the image generation system according to the embodiment.

One image-capturing device 104 transmits, to image generation device 101, an image captured by one camera 102 (S1). Similarly, another image-capturing device 104 transmits, to image generation device 101, an image captured by another camera 102 (S2).

Next, in image generation device 101, processor 106 obtains a plurality of images captured by the plurality of cameras 102 (S3). At this time, processor 106 may obtain a plurality of images captured by the plurality of cameras 102 with the same timing.

Subsequently, reconstruction module 4 of processor 106 generates a 3D model using the plurality of obtained images and the camera parameters of the plurality of cameras 102 obtained by the calibration process already performed by calibration module 2 (S4).

Rendering module 8 of processor 106 generates, using the generated 3D model and the plurality of images, a virtual image of the target space viewed from the virtual viewpoint (S5).

Rendering module 8 outputs the generated virtual image to display 108 (S6).

Input device 110 outputs, to display 108, an input signal indicating a virtual viewpoint desired by a user (S7).

Display 108 displays a virtual image corresponding to the input signal among virtual images output by image generation device 101 (S8).

Figure 4:
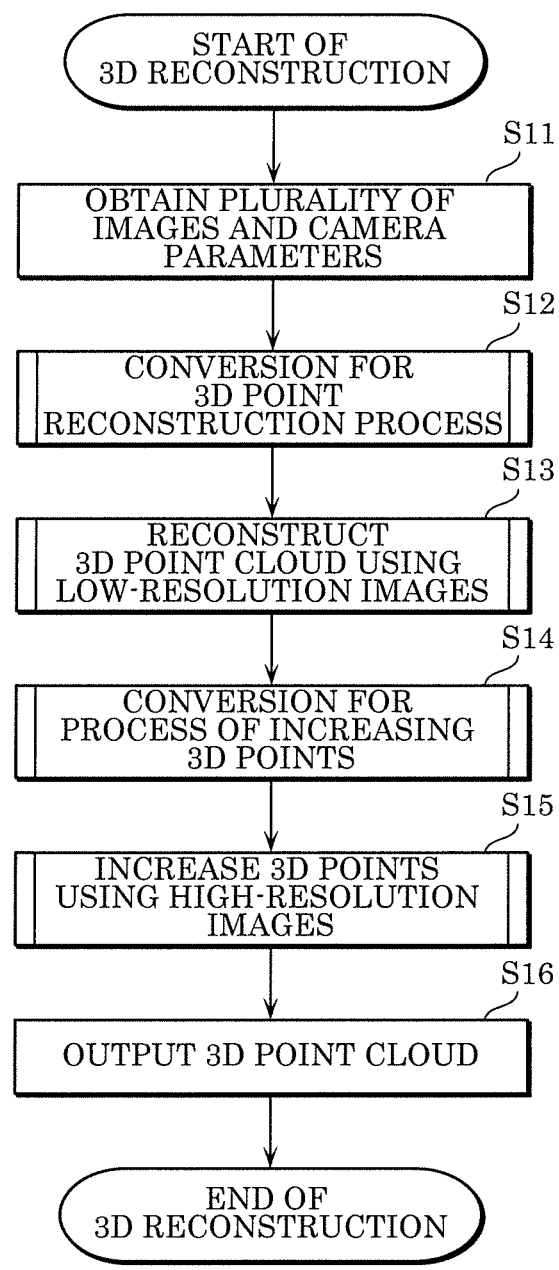
FIG. 4 is a flowchart illustrating the first example of processing in a 3D reconstruction method according to an embodiment.

FIG. 4 is a flowchart illustrating the first example of processing in the 3D reconstruction method according to the embodiment.

First, reconstruction module 4 obtains, from the plurality of image-capturing devices 104, a plurality of images captured by the plurality of cameras 102 and a plurality of camera parameters in one-to-one correspondence with the plurality of cameras 102 (S11).

Next, conversion module 202 of reconstruction module 4 converts the plurality of obtained images and the plurality of obtained camera parameters and obtains a plurality of first low-resolution images and a plurality of first converted camera parameters that are to be used in the next step, i.e., Step S13 (S12). Note that the conversion rate in Step S12 may be determined in advance or may be automatically determined according to the resolution of images, other image information of images, and so on.

Next, 3D point reconstruction module 204 of reconstruction module 4 reconstructs a 3D point cloud from the plurality of first low-resolution images and the plurality of first converted camera parameters (S13). Details of the process of reconstructing the 3D point cloud will be described later with reference to FIG. 10 to FIG. 12.

Next, conversion module 202 converts the plurality of images and the plurality of camera parameters and obtains a plurality of high-resolution images and a plurality of second converted camera parameters that are to be used in the next step, i.e., Step S15 (S14). In Step S14, conversion module 202 generates a plurality of high-resolution images and a plurality of third converted camera parameters having a resolution higher than or equal to the resolution of the plurality of first low-resolution images and the plurality of first converted camera parameters that have been generated in Step S12. The conversion in Step S14 does not need to be performed; in the next step, i.e., Step S15, the plurality of images and the plurality of camera parameters that have not been converted may be used. This means that the plurality of high-resolution images may be the plurality of images that have not been converted, and in this case, the plurality of camera parameters that have not been converted may be used. Note that the conversion rate in Step S14 may be determined in advance or may be automatically determined according to the resolution of images, other image information of images, the number of 3D points, and so on. Details of the conversion processes in Steps S12 and S14 will be described later with reference to FIG. 7 to FIG. 9.

Note that in Step S12, conversion module 202 may generate the plurality of first low-resolution images, the plurality of first converted camera parameters, the plurality of high-resolution images, and the plurality of third converted camera parameters that are to be used in Steps S13 and S15. In this case, Step S14 is omitted.

Next, using the plurality of high-resolution images and the plurality of corresponding third converted camera parameters that have been generated in Step S14, 3D point increase module 206 of reconstruction module 4 increases 3D points in the reconstructed 3D point cloud (S15). Details of the process of increasing 3D points will be described later with reference to FIG. 13.

At the end, reconstruction module 4 outputs dense 3D points obtained by increasing 3D points in Step S15 (S16).

Direct use of high-resolution images in 3D reconstruction, which is done in the related art, makes it possible to reconstruct a dense 3D model, but in this case, the 3D reconstruction requires long processing time and may result in generation of noisy 3D points. Therefore, in the 3D reconstruction according to the present disclosure, the plurality images to be used is down-sampled first, and the plurality of obtained low-resolution images are used. Thus, the processing load in the 3D reconstruction can be reduced, resulting in generation of 3D points with less noise.

On the other hand, when the low-resolution images are used in the 3D reconstruction, the initial sparse 3D point cloud can be reconstructed efficiently with less noisy points, but the density thereof is not sufficient. Therefore, in order to improve the accuracy, the process of increasing, using the high-resolution images having a resolution higher than the resolution of the low-resolution images, 3D points included in the sparse 3D point cloud generated from the low-resolution images is performed. For example, the plurality of input images with original resolution may be down-sampled to ¼ times for initial 3D reconstruction. Subsequently, using the images with original resolution, the 3D points in the reconstructed 3D point cloud are increased to make the reconstructed 3D point cloud denser. In this way, the 3D point cloud is reconstructed using the plurality of low-resolution images; thus, it is possible to reduce the noise in the 3D point cloud, requiring less processing time in the reconstruction process. Furthermore, the use of the images with higher resolution makes it possible to accurately specify corresponding textures of the images and, accordingly, the matching accuracy can be improved, leading to improvement in the accuracy of the 3D point cloud.

Figure 5:
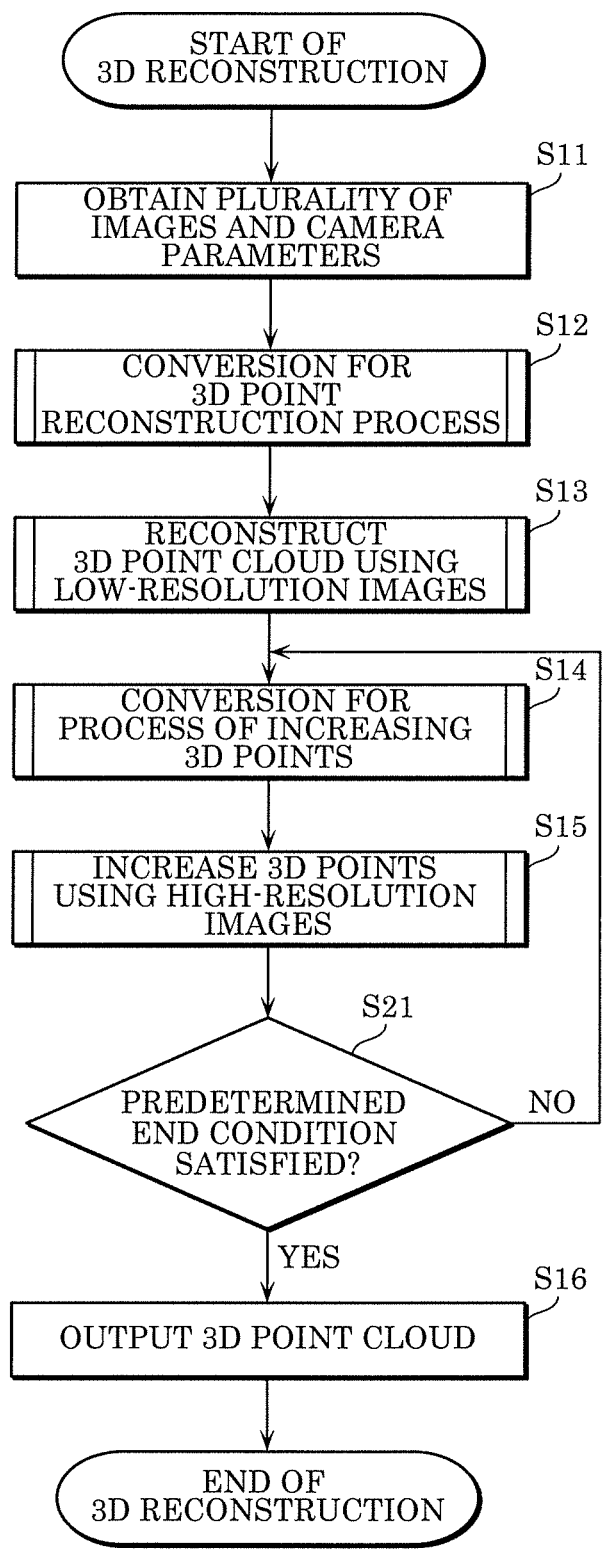
FIG. 5 is a flowchart illustrating the second example of processing in a 3D reconstruction method according to an embodiment.

FIG. 5 is a flowchart illustrating the second example of the processing in the 3D reconstruction method according to the embodiment.

The second example of the processing in the 3D reconstruction method is different from the first example in that determination in Step S21 is further performed after Step S15 of the processing in the first example. The other processes are the same as or similar to those in the first example and thus are assigned the same reference signs; description thereof will be omitted.

Following Step S15, reconstruction module 4 determines whether or not a predetermined end condition is satisfied (S21). When determining that the predetermined end condition is satisfied (YES in S21), reconstruction module 4 proceeds to the next step, i.e., Step S16, while, when reconstruction module 4 determines that the predetermined end condition is not satisfied (NO in S21), the processing returns to Step S14. Thus, reconstruction module 4 repeats Steps S14 and S15 until the predetermined end condition is satisfied.

Here, the predetermined end condition in Step S21 is, for example, that (i) the number of 3D points included in the reconstructed 3D point cloud exceeds a predetermined number, (ii) the density of the 3D point cloud exceeds a predetermined density (in other words, the number of 3D points per unit volume exceeds a predetermined number), or (iii) the number of times that Steps S14 and S15 have been performed exceeds a predetermined number. The predetermined number in each of conditions (i) to (iii) exemplified as the predetermined end condition may be determined in advance or may be automatically determined according to the resolution, image information, etc., of the plurality of images.

Note that when the predetermined end condition is not satisfied in Step S21, conversion module 202 performs conversion in following Step S14 at a conversion rate greater than the conversion rate (at a sampling rate less than the sampling rate) used in last Step S14. Therefore, conversion module 202 generates a plurality of second low-resolution images having a resolution higher than the resolution of the plurality of first low-resolution images obtained in last Step S14. In this manner, every time Step S14 is repeated, conversion module 202 performs, on the plurality of images, conversion in which the variation width of resolution between images before and after down-sampling is small (at a greater conversion rate or less sampling rate), and thus generates the plurality of low-resolution images. Similarly, using substantially the same conversion rate as the conversion rate used to down-sample the plurality of images, conversion module 202 converts the plurality of camera parameters, and thus generates the plurality of converted camera parameters.

Furthermore, in Step S15, the process of increasing 3D points using the plurality of second converted camera parameters and the plurality of second low-resolution images having a resolution higher than the resolution is performed in last Step S15. Thus, the number of 3D points in the 3D point cloud to be output or the density of the 3D point cloud to be output can be changed according to the purpose.

Figure 6:
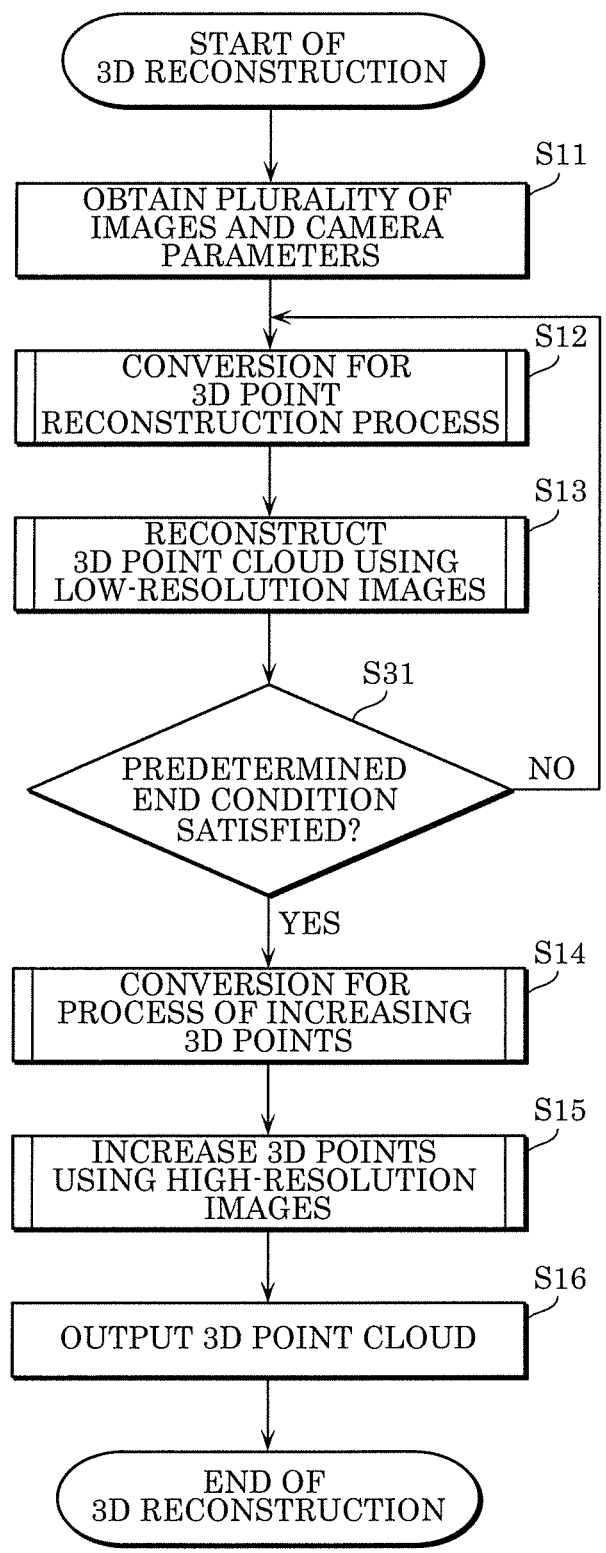
FIG. 6 is a flowchart illustrating the third example of processing in a 3D reconstruction method according to an embodiment.

FIG. 6 is a flowchart illustrating the third example of the processing in the 3D reconstruction method according to the embodiment.

The third example of the processing in the 3D reconstruction method is different from the first example in that determination in Step S31 is further performed after Step S13 of the processing in the first example. The other processes are the same as or similar to those in the first example and thus are assigned the same reference signs; description thereof will be omitted.

Following Step S13, reconstruction module 4 determines whether or not a predetermined end condition is satisfied (S31). When determining that the predetermined end condition is satisfied (YES in S31), reconstruction module 4 proceeds to the next step, i.e., Step S14, while, when reconstruction module 4 determines that the predetermined end condition is not satisfied (NO in S31), the processing returns to Step S12. Thus, reconstruction module 4 repeats Steps S12 and S13 until the predetermined end condition is satisfied.

Here, the predetermined end condition in Step S31 is, for example, that (i) the number of 3D points included in the reconstructed 3D point cloud exceeds a predetermined number, (ii) the density of the 3D point cloud exceeds a predetermined density (in other words, the number of 3D points per unit volume exceeds a predetermined number), or (iii) the number of times that Steps S12 and S13 have been performed exceeds a predetermined number. The predetermined number in each of conditions (i) to (iii) exemplified as the predetermined end condition may be determined in advance or may be automatically determined according to the resolution, image information, etc., of the plurality of images.

Note that when the predetermined end condition is not satisfied in Step S31, conversion module 202 performs conversion in following Step S12 at a conversion rate greater than the conversion rate (at a sampling rate less than the sampling rate) used in last Step S12. Therefore, conversion module 202 generates a plurality of second low-resolution images having a resolution higher than the resolution of the plurality of first low-resolution images obtained in last Step S12. In this manner, every time Step S12 is repeated, conversion module 202 performs, on the plurality of images, conversion in which the variation width of down-sampling is small (at a greater conversion rate or less sampling rate), and thus generates the plurality of low-resolution images. Similarly, using substantially the same conversion rate as the conversion rate used to down-sample the plurality of images, conversion module 202 converts the plurality of camera parameters, and thus generates the plurality of converted camera parameters.

Furthermore, in Step S13, the 3D point cloud is reconstructed by performing the process using the plurality of second converted camera parameters and the plurality of second low-resolution images having a resolution higher than the resolution in last Step S13.

Since 3D points in the 3D point cloud are increased in Step S15 on the basis of the 3D point cloud reconstructed in Step S13, it is necessary to reconstruct a 3D point cloud including at least a given number of 3D points in Step S13 in order to eventually output a dense 3D point cloud. According to the 3D reconstruction method in the third example, the number of 3D points included in the 3D point cloud reconstructed in Step S13 can be at least the given number, and thus it is possible to stably generate a dense 3D point cloud.

Figure 7:
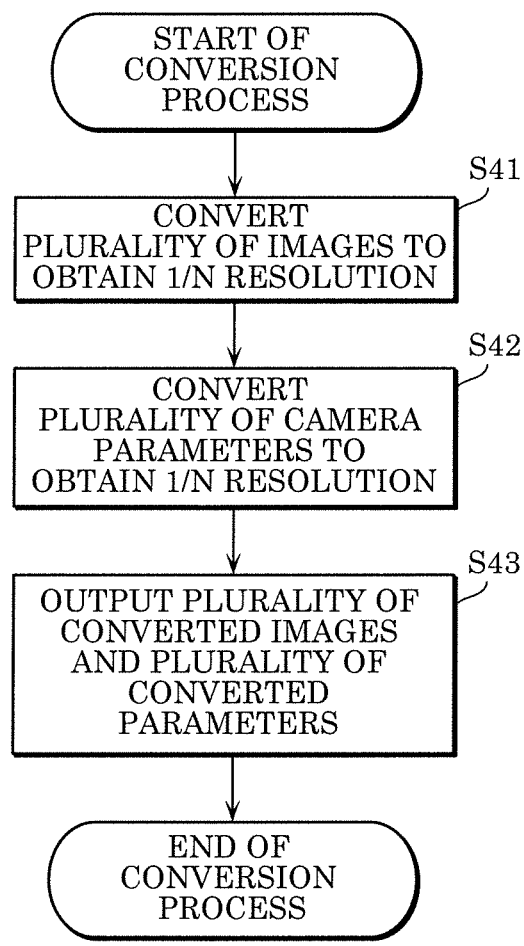
FIG. 7 is a flowchart illustrating an example of a conversion process in a 3D reconstruction method according to an embodiment.

FIG. 7 is a flowchart illustrating an example of the conversion process in the 3D reconstruction method according to the embodiment.

Conversion module 202 of reconstruction module 4 converts the plurality of obtained images into a plurality of images with 1/N resolution (S41). Here, 1/N is a conversion rate where N is a real number of 1 or more.

Next, conversion module 202 converts, into a plurality of camera parameters with 1/N resolution, the plurality of camera parameters in one-to-one correspondence with the plurality of cameras 102 that have captured the plurality of image (S42).

At the end, conversion module 202 outputs the plurality of first low-resolution images resulting from the conversion and the plurality of first converted camera parameters resulting from the conversion (S43). Specifically, the plurality of first low-resolution images and the plurality of first converted camera parameters are output to 3D point reconstruction module 204 or 3D point increase module 206.

The foregoing describes the case where the conversion process in Step S12 is performed, but the conversion process in Step S14 is performed in substantially the same manner. In the conversion process in Step S14, a conversion rate having a greater value than the conversion rate used in the conversion process in Step S12 is used.

Figure 8:
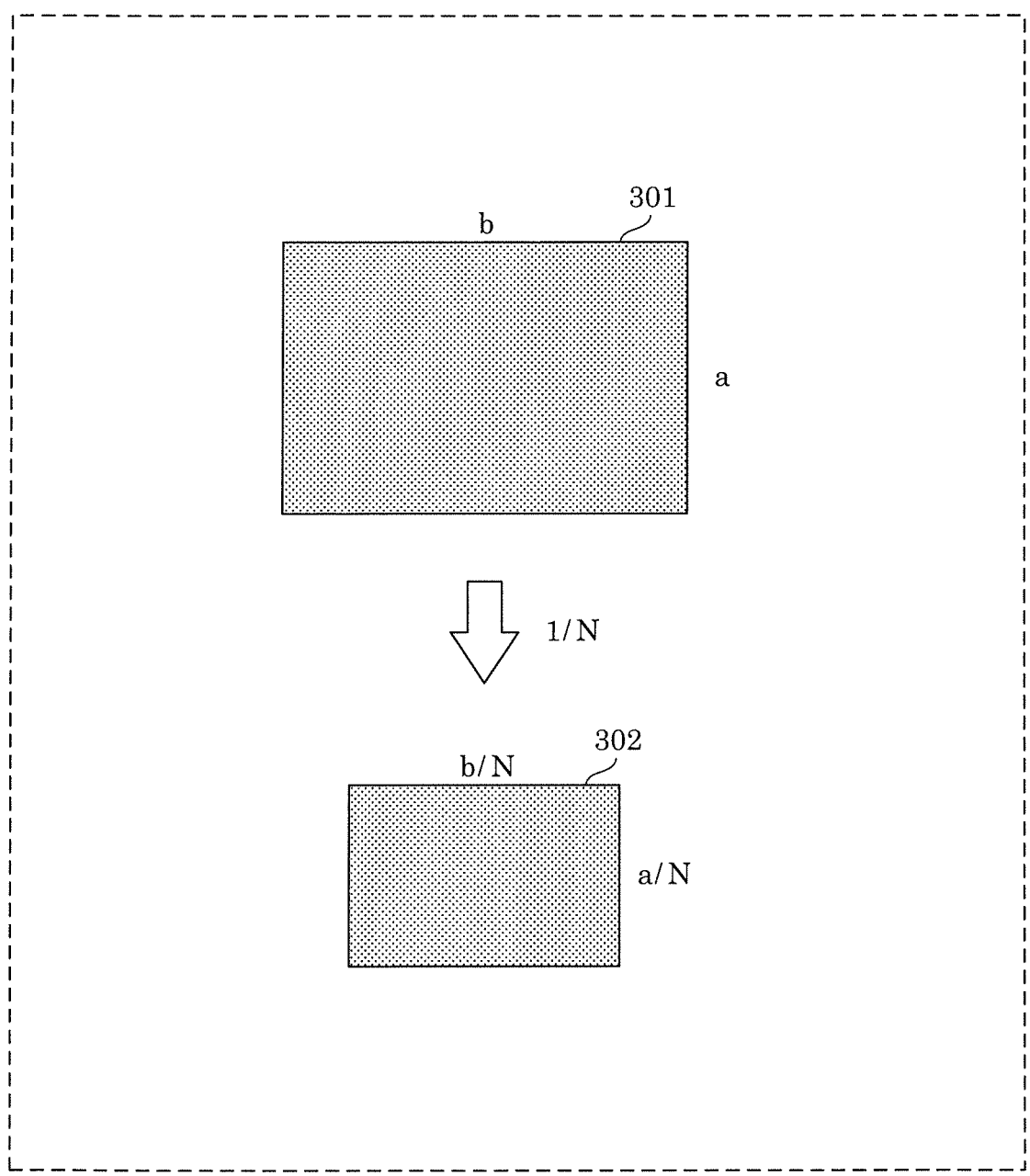
FIG. 8 is a diagram for describing an example of a conversion process on an image according to an embodiment.

FIG. 8 is a diagram for describing an example of the conversion process on an image according to the embodiment.

In the case of converting image 301 having a resolution of a×b pixels, conversion module 202 can convert each side at a factor of 1/N to obtain smaller image 302 having a resolution of a/N×b/N. Several known methods can be used for the conversion process and are not limited in the present disclosure. In another example of the conversion process, some pixels having fixe values may be padded to image boundaries.

Figure 9:
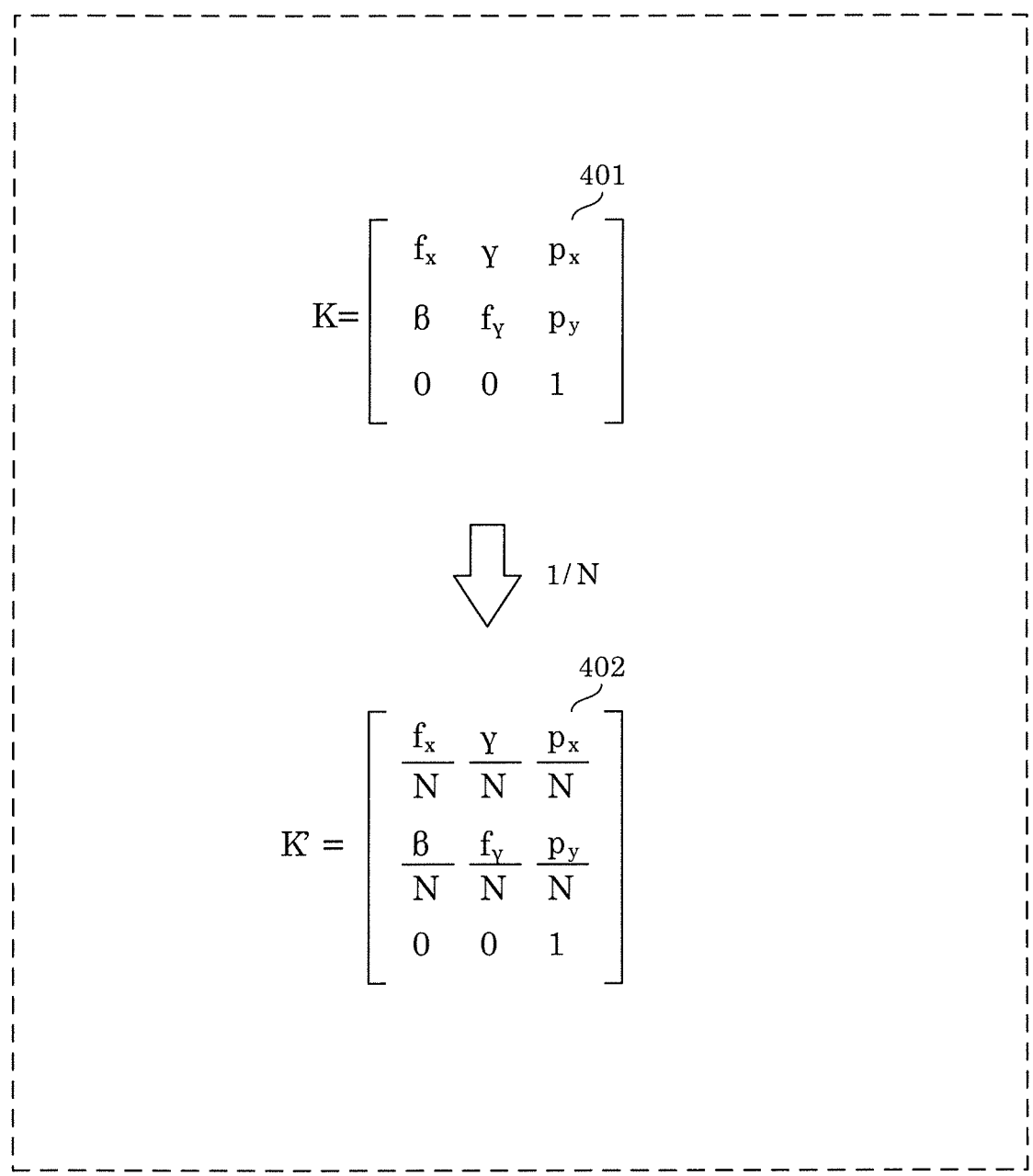
FIG. 9 is a diagram for describing an example of a conversion process on a camera parameter according to an embodiment.

FIG. 9 is a diagram for describing an example of the conversion process on a camera parameter according to the embodiment.

Suppose the projection matrix of a camera is represented by P; then, P is expressed by Equation 1 indicated below.

$$P=K[R|T] \qquad \text{(Equation 1)}$$

Here, K represents an internal parameter of a camera. [R|T] represents an external parameter indicating rotation and translation of the camera. Internal parameter K is shown as matrix 401 in FIG. 9. The down-sampling of camera parameters is performed on the internal parameter, but is not performed on the external parameter. This means that the external parameter is maintained unchanged even after the down-sampling of camera parameters. Internal parameter K is down-sampled at a factor of 1/N, resulting in internal parameter K' shown as matrix 402. Note that in many cases, internal parameters β and γ may each have zero (0) value.

Figure 10:
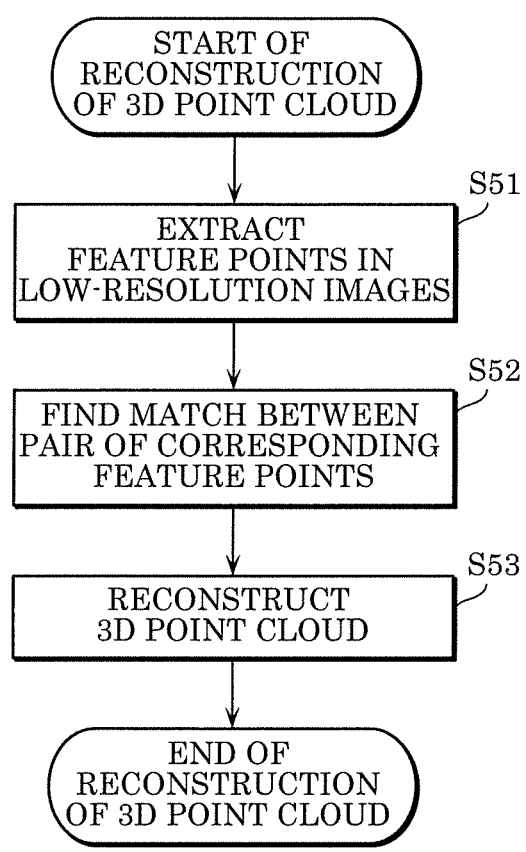
FIG. 10 is a flowchart illustrating an example of the process of reconstructing a 3D point cloud according to an embodiment.

FIG. 10 is a flowchart illustrating an example of the process of reconstructing the 3D point cloud according to the embodiment.

Three-dimensional point reconstruction module 204 of reconstruction module 4 extracts a feature point (key point) from each of the plurality of low-resolution images resulting from the conversion (S51). Note that the plurality of current low-resolution images are the plurality of low-resolution images output in Step S12 and, for example, are the plurality of first low-resolution images. Note that in the example in FIG. 6, the plurality of low-resolution images include, for example, the plurality of first low-resolution images and the plurality of second low-resolution images and include the plurality of low-resolution images output in the repeated conversion process.

Next, using feature points extracted from two low-resolution images among the plurality of low-resolution images, 3D point reconstruction module 204 finds a match between corresponding feature points of the two low-resolution images (S52). Thus, a plurality of pairs of corresponding feature points are obtained. At this time, during search for a feature point corresponding to a feature point of one image, the search range in the other image may be limited using an epipolar constraint or the like. The process in Step S52 may be performed on all the combinations that can be obtained by extracting two of the plurality of low-resolution images.

At the end, using the pair of feature points, 3D point reconstruction module 204 reconstructs a 3D point cloud by triangulation (S53).

Figure 11:
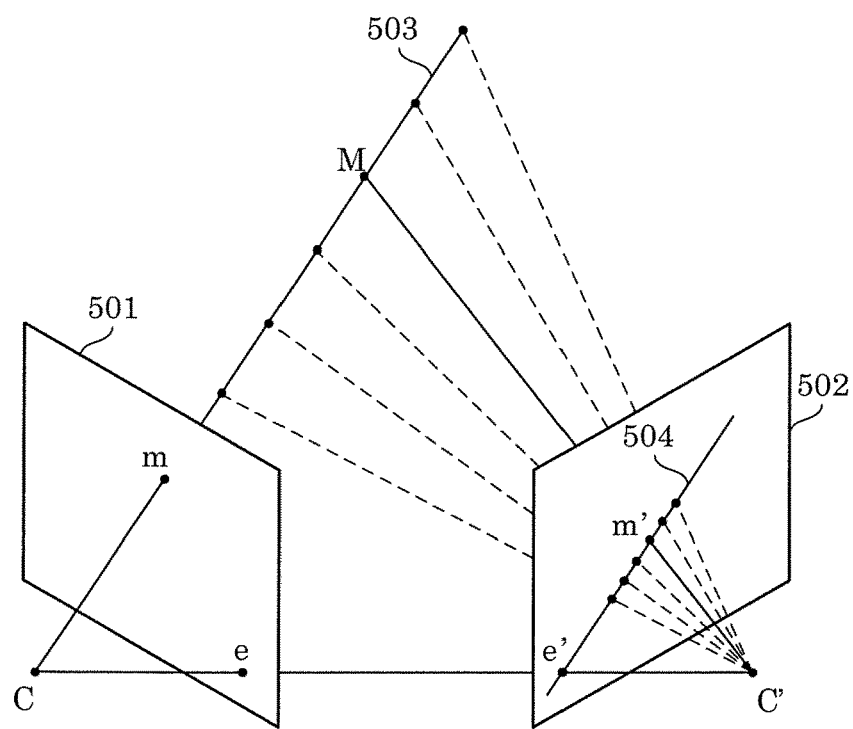
FIG. 11 is a diagram illustrating an epipolar constraint of a pair of feature points between two images.

FIG. 11 is a diagram illustrating an epipolar constraint of a pair of feature points between two images.

An example will be described in which, suppose 2D point m in image 501 obtained by capturing an image of 3D point M in the 3D space is a feature point, a feature point corresponding to 2D point m is obtained from image 502 using an epipolar constraint. First, using the external parameter of each camera, optical center C of a camera that has captured image 501 and optical center C' of a camera that has captured image 502 are determined. Subsequently, straight line 503 in the 3D space that passes through optical center C and 2D point m is calculated using optical center C of the camera and the coordinates of 2D point m in image 501. Next, using straight line 503 and the external parameter of the camera that has captured image 502, epipolar line 504 on image 502 which corresponds to straight line 503 is calculated. Subsequently, the feature points on epipolar line 504 in 502 are triangulated, and thus 3D point candidates can be obtained. In other words, all the feature points on epipolar line 504 can be used as candidates for specifying 2D point m' corresponding to 2D point m on straight line 503.

Figure 12:
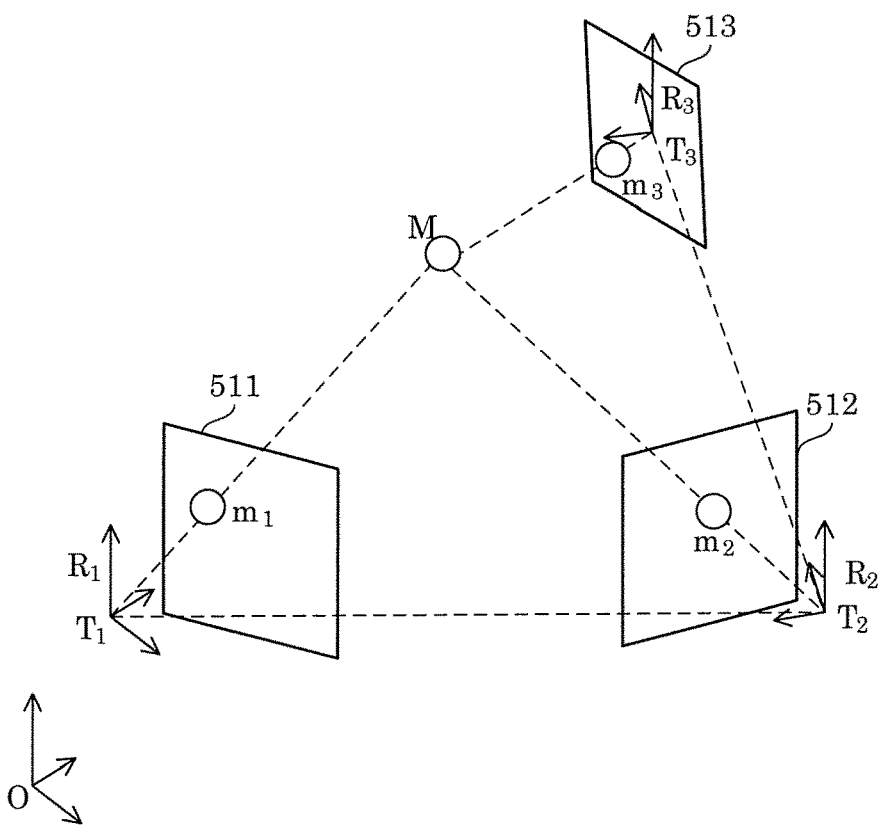
FIG. 12 is a diagram for describing a method for estimating a camera parameter and a method for reconstructing a 3D model.

FIG. 12 is a diagram for describing a method for estimating a camera parameter and a method for reconstructing a 3D model. An example will be explained in which the internal parameters of the cameras are known, and using three frames (image 511, image 512, and image 513), external parameters of the cameras are estimated, and a 3D model of a subject is reconstructed.

In order to obtain the camera parameter of each of the cameras, it is necessary to calculate rotation matrices R1, R2, R3 and translation vectors T1, T2, T3 of the cameras in the world coordinate system with the origin at zero (0). First, a method for calculating the rotation matrices and the translation vectors of the cameras that have captured image 511 and image 512 will be described. When point $m_1=(u_1, v_1, 1)$ on image 511 and point $m_2$ on image 512 correspond to each other, an epipolar equation satisfying Equation 2 holds true for these points.

[Math. 1]

$$m_1^T F m_2 = 0 \qquad \text{(Equation 2)}$$

Here, F is called a fundamental matrix (F matrix). Using internal parameter K of each of the cameras, reconstruction module 4 is capable of obtaining points as $\tilde{m}_1=(x_1, y_1, z_1)$ and $\tilde{m}_2=(x_2, y_2, z_2)$ in the coordinate systems of the respective cameras according to the conversion equation indicated in Equation 3. The epipolar equation can be rewritten as in Equation 4.

[Math. 2]

$$\tilde{m} = Km \qquad \text{(Equation 3)}$$

[Math. 3]

$$\tilde{m}_1^T E \tilde{m}_2 = 0 \qquad \text{(Equation 4)}$$

Here, E is called an essential matrix (E matrix). Reconstruction module 4 is capable of calculating each element of the E matrix using a plurality of corresponding points. Furthermore, after calculating each element of the F matrix using a plurality of corresponding points such as points $m_1$ and $m_2$ between images, reconstruction module 4 may obtain the E matrix according to the conversion equation in Equation 5.

$$E = K^{-1} F K \qquad \text{(Equation 5)}$$

By decomposing the E matrix, reconstruction module 4 can obtain a rotation matrix and a translation vector from image 511 to image 512 in the world coordinate system. When the position of the first camera in the world coordinate system and the slope of the first camera with respect to each axis of the world coordinate system are known, reconstruction module 4 can obtain the positions and the attitudes of the first and second cameras in the world coordinate system using the relative relationship between the first camera and the second camera. Reconstruction module 4 may measure in advance or calculate the position and the attitude of the first camera in the world coordinate system using camera information other than video (for example, information obtained by sensors such as a gyroscope, an acceleration sensor, or the like included in the camera). Furthermore, assuming the camera coordinate system of the first camera as the world coordinate system, the position and the attitude of another camera may be calculated.

Note that lens distortion of a camera is taken into consideration, reconstruction module 4 corrects the position of a point on an image using a distortion model and obtains an F matrix or an E matrix using the corrected position. Reconstruction module 4 uses, as an example, a distortion model for the radial direction of the lens indicated in Equation 6.

$$u_{undistorted} = u(1 + k_1 r^2 + k_2 r^4 + k_3 r^6)$$

$$v_{undistorted} = v(1 + k_1 r^2 + k_2 r^4 + k_3 r^6)$$

$$r^2 = u^2 + v^2 \qquad \text{(Equation 6)}$$

Furthermore, with a triangle formed using the rotation matrices and the translation vectors of image 511 and image 512, reconstruction module 4 can obtain the coordinates of 3D point M in the world coordinate system which corresponds to the corresponding points.

Furthermore, the aforementioned geometrical relationship can be extended to three viewpoints. In the case where image 513 is added to image 511 and image 512, reconstruction module 4 further calculates an E matrix for images 512, 513 and an E matrix for images 511, 513, and obtains relative rotation matrix and translation vector between each pair of cameras. By integrating these results, reconstruction module 4 can calculate a rotation matrix and a translation vector of the camera for image 513 in the world coordinate system.

The rotation matrix and the translation vector of image 513 may be calculated using corresponding points between image 513 and image 511 and between image 513 and 512. Specifically, corresponding points between image 511 and image 513 and corresponding points between image 512 and image 513 are determined. Here, assume that point $m_3$ on image 513 which corresponds to point $m_1$ on image 511 and point $m_2$ on image 512 is obtained, the coordinates of 3D point M corresponding to these points have already been obtained, and thus the relationship between a point on image 513 and coordinates in the 3D space can be obtained. At this time, Equation 7 holds.

[Math. 4]

$$\tilde{m} = Pm \qquad \text{(Equation 7)}$$

Here, P is called a perspective matrix (P matrix). The relationship in Equation 8 holds true for the P matrix, the E matrix, and the internal matrix; thus, reconstruction module 4 can obtain the E matrix of image 513 and accordingly determine the rotation matrix and the translation vector thereof.

$$P = KE \qquad \text{(Equation 8)}$$

Note that even when the internal parameter is not known, after calculating the F matrix or the P matrix, reconstruction module 4 can determine the internal matrix and the E matrix by dividing the F matrix and the P matrix under the constraint that the internal matrix is an upper triangular matrix and the E matrix is a positive definite symmetric matrix.

Figure 13:
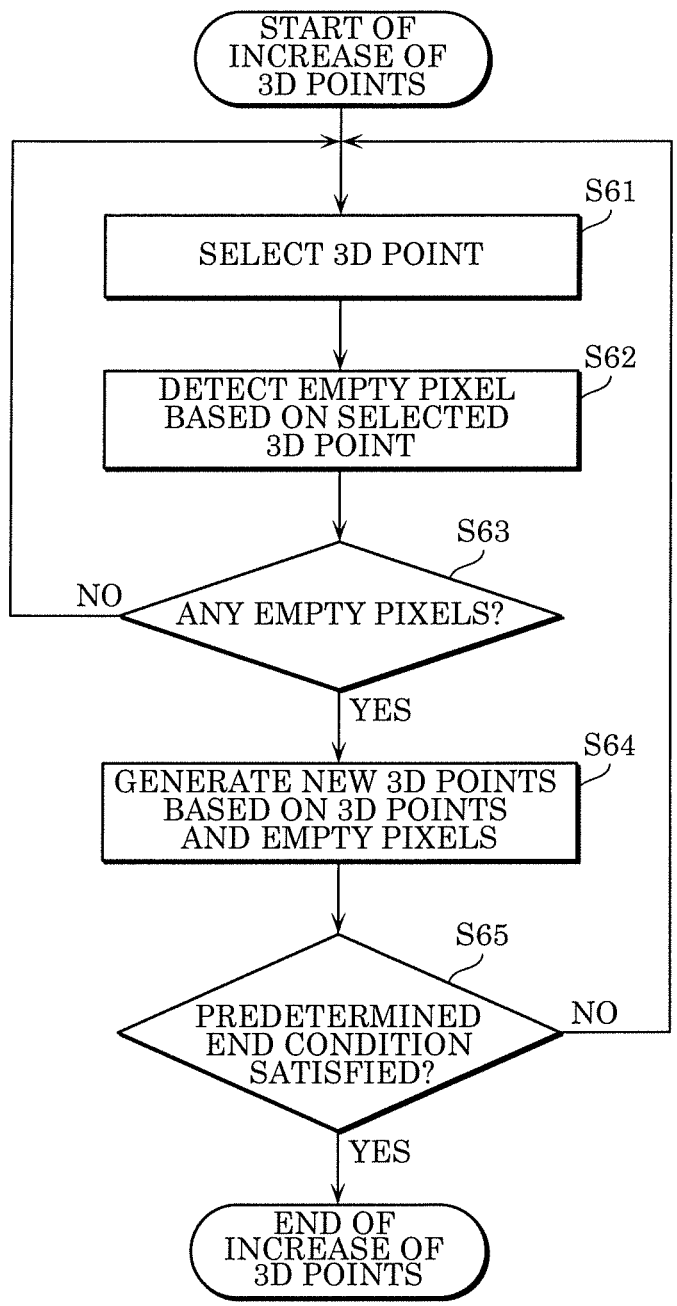
FIG. 13 is a flowchart illustrating an example of the process of increasing 3D points in a 3D point cloud according to an embodiment.

FIG. 13 is a flowchart illustrating an example of the process of increasing 3D points in the 3D point cloud according to the embodiment.

Three-dimensional point increase module 206 selects, as a current 3D point, one 3D point from among all the 3D points included in the 3D point cloud (S61).

Next, 3D point increase module 206 detects an empty pixel on the basis of the selected 3D point (S62). An empty pixel indicates a pixel with no corresponding 3D points. For example, for each of the plurality of 3D points, 3D point increase module 206 may determine in advance whether or not a pixel corresponding to the 3D point is included in each of the plurality of images. Three-dimensional increase module 206 may associate the determination result with all the 3D points. For example, every 3D point may hold correspondence information indicating which pixel on which image the 3D point corresponds to. In the case where the correspondence information has been held in the 3D point, 3D point increase module 206 can efficiently detect which pixel on which image the selected 3D point corresponds to. Furthermore, 3D point increase module 206 can efficiently detect an empty pixel around the corresponding pixel.

Next, 3D point increase module 206 determines whether there is any empty pixel (S63).

When determining that there is an empty pixel (YES in S63), 3D point increase module 206 generates a new 3D point on the basis of the current 3D point and the detected empty pixel (S64). Furthermore, in Step S64, after generating the new 3D point, 3D point increase module 206 may modify the 3D position, the 3D direction, etc., of the new 3D point according to luminance information of the images, color information of the images, and information of 3D points around the current 3D point, for example. Moreover, 3D point increase module 206 may delete the new 3D point according to the luminance information of the images, the color information of the images, and the information of 3D points around the current 3D point, for example.

When determining that there are no empty pixels (NO in S63), 3D point increase module 206 returns to Step S61 and selects the next current 3D point from among all the 3D points included in the 3D point cloud.

Three-dimensional point increase module 206 determines whether or not a predetermined end condition is satisfied (S65). When determining that the predetermined end condition is satisfied (YES in S65), 3D point increase module 206 ends the processing, and when determining that the predetermined end condition is not satisfied (NO in S65), 3D point increase module 206 returns to Step S61.

Here, the predetermined end condition in Step S65 is, for example, that (i) the number of times that Steps S61 to S64 have been performed exceeds a predetermined number, (ii) at least a predetermined number of 3D points have been selected as the current 3D point, (iii) the number of 3D points included in the 3D point cloud exceeds a predetermined number, (iv) the density of the 3D point cloud exceeds a predetermined density (in other words, the number of 3D points per unit volume exceeds a predetermined number), or (v) at least a predetermined length of time has elapsed since the start of the process of increasing 3D points. The predetermined number in each of conditions (i) to (iv) exemplified as the predetermined end condition and the predetermined length of time in condition (v) may be determined in advance or may be automatically determined according to the resolution, image information, etc., of the plurality of images.

FIG. 14 is a diagram illustrating an example of the comparison results of processing time and the number of reconstructed 3D points.

As illustrated in FIG. 14, in a working example where the method according to the present disclosure is performed, the number of points in the 3D point cloud can be great and the processing time per point can be short compared to those in Comparative Example 1 where a 3D point cloud is reconstructed using low-resolution images. Furthermore, it is found that in the working example, the number of points in the 3D point cloud can be great and the total processing time and the processing time per point can be short compared to those in Comparative Example 2 where a 3D point cloud is reconstructed using high-resolution images. Thus, in the method according to the working example, the processing time can be short and a denser 3D point cloud can be generated compared to Comparative Examples 1 and 2.

Figure 15A:
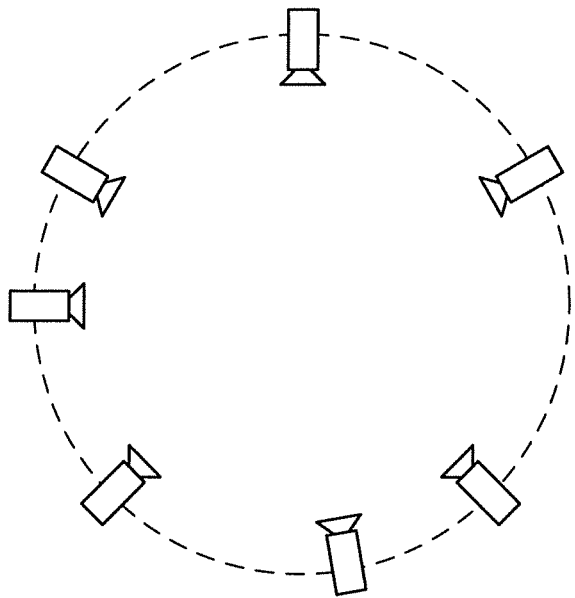
FIG. 15A is a diagram illustrating a camera layout example applied to perform a 3D point cloud reconstruction method (3D reconstruction)
Figure 15B:
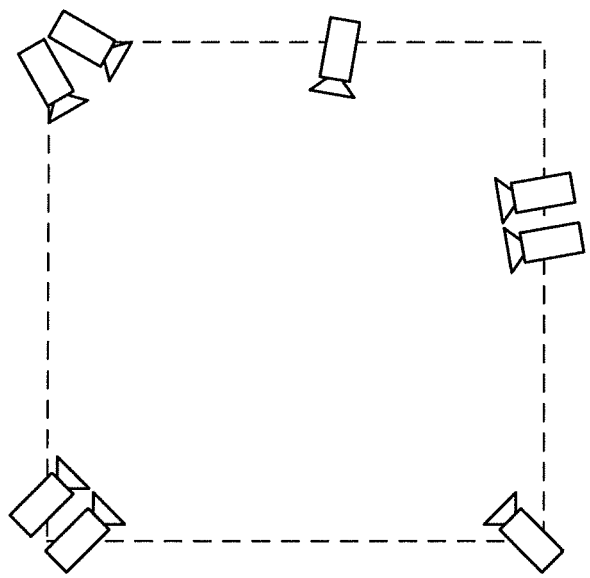
FIG. 15B is a diagram illustrating a camera layout example applied to perform a 3D point cloud reconstruction method (3D reconstruction)

FIG. 15A and FIG. 15B are diagrams each illustrating a camera layout example applied to perform a 3D point cloud reconstruction method (3D reconstruction).

In the case where a plurality of cameras are arranged in a space in order to perform the 3D reconstruction, the plurality of cameras may be dispersed by separating each of the cameras from an adjacent one of the cameras so that the distance between the adjacent cameras is greater than or equal to a predetermined distance as illustrated in the schematic diagram in FIG. 15A.

A plurality of cameras may be dispersed in a space by setting one or more cameras including two cameras as a group and separating each camera group from an adjacent camera group so that the distance between the adjacent camera groups is greater than or equal to a predetermined distance as illustrated in the schematic diagram in FIG. 15B. In this case, one camera may be treated as a camera group. In other words, a camera group made up of one camera and a camera group made up of two or more cameras may be mixed. Note that two or more cameras belonging to the same camera group may be cameras located in close proximity to each other at less than the predetermined distance or may be cameras having optical axis directions with a difference less than a predetermined angle range. Note that stereo camera may be used as the type of a standalone camera; in the case of using the stereo camera, distance information may be obtained using a single position. Note that the cameras do not need to be installed at the same level and may be installed at different levels.

When the standalone cameras are arranged, the 3D reconstruction is performed with reference to information of one or more other cameras. When the cameras including the camera groups are arranged, a stepwise process may be performed in which the 3D point cloud is generated and the distance information is obtained on per camera group basis, and the results of the camera groups are integrated to perform the 3D reconstruction. Furthermore, as in arrangement of the standalone cameras, information may be referred to between the camera groups to perform the 3D reconstruction.

Figure 16:
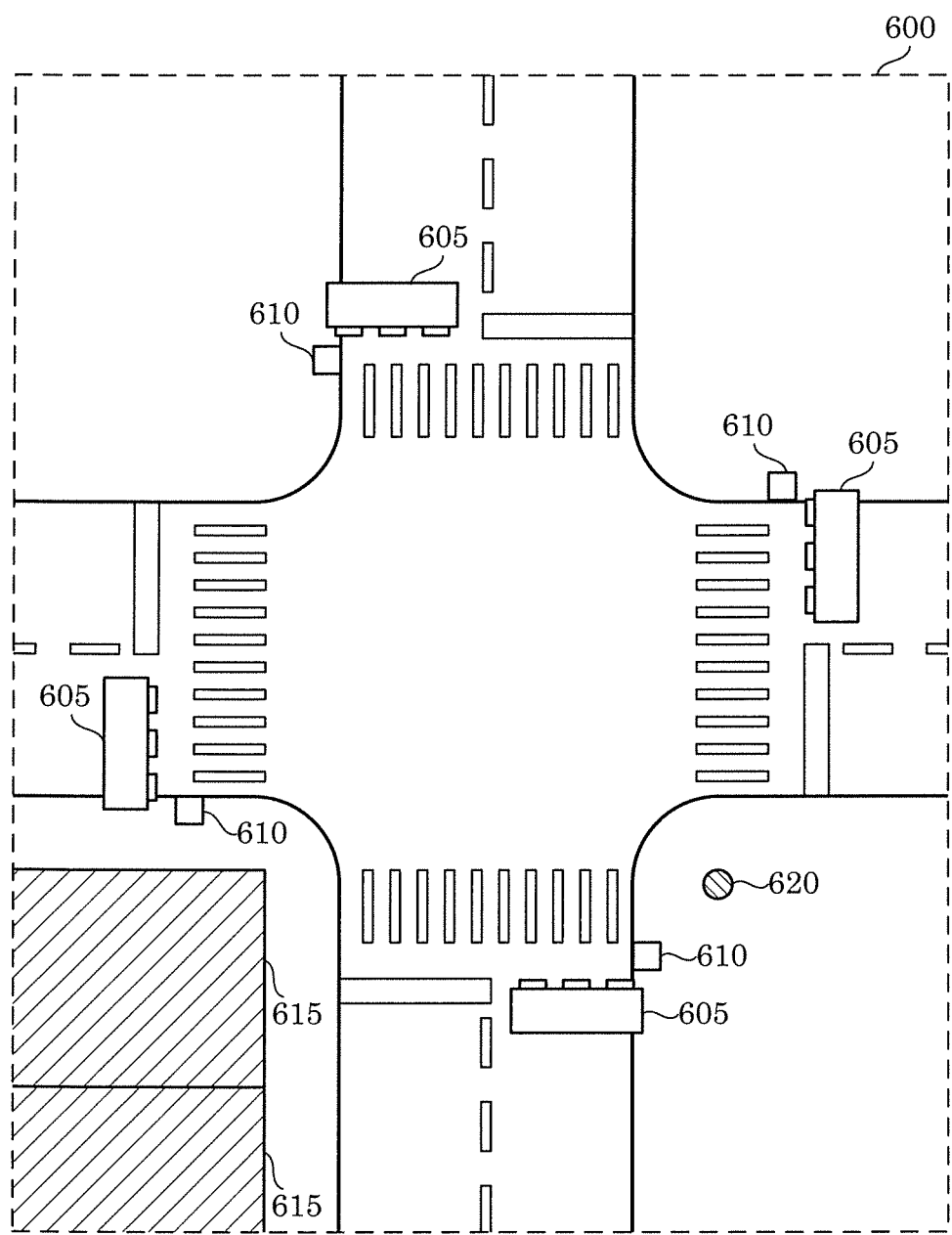
FIG. 16 is a diagram illustrating a specific example of a camera arrangement method applied to perform a 3D point cloud reconstruction method (3D reconstruction) according to the present disclosure.

FIG. 16 is a diagram illustrating a specific example of a camera arrangement method applied to perform a 3D point cloud reconstruction method (3D reconstruction) according to the present disclosure.

The case where the cameras are arranged at an intersection as a specific example of the camera arrangement method will be described.

An example of the method for arranging the plurality of cameras at intersection 600 to perform the 3D reconstruction is as follows.

In order to capture images from above a roadway, the standalone camera, the camera group, or both is arranged on each of four traffic signals 605.

In order to capture images from above a sidewalk, the standalone camera, the camera group, or both is arranged on pedestrian signal 610, structure 615, and installation pole 620.

Note that when there are structures such as a footbridge and a lighting fixture, the cameras, etc., may be arranged on the structures.

The camera may be arranged in the air above the center of the intersection.

Mobile cameras such as an onboard camera and a camera mounted on a drone may be used.

A camera layout that is the same as or similar to that applied to the intersection described above may be applied to a level crossing.

Figure 17:
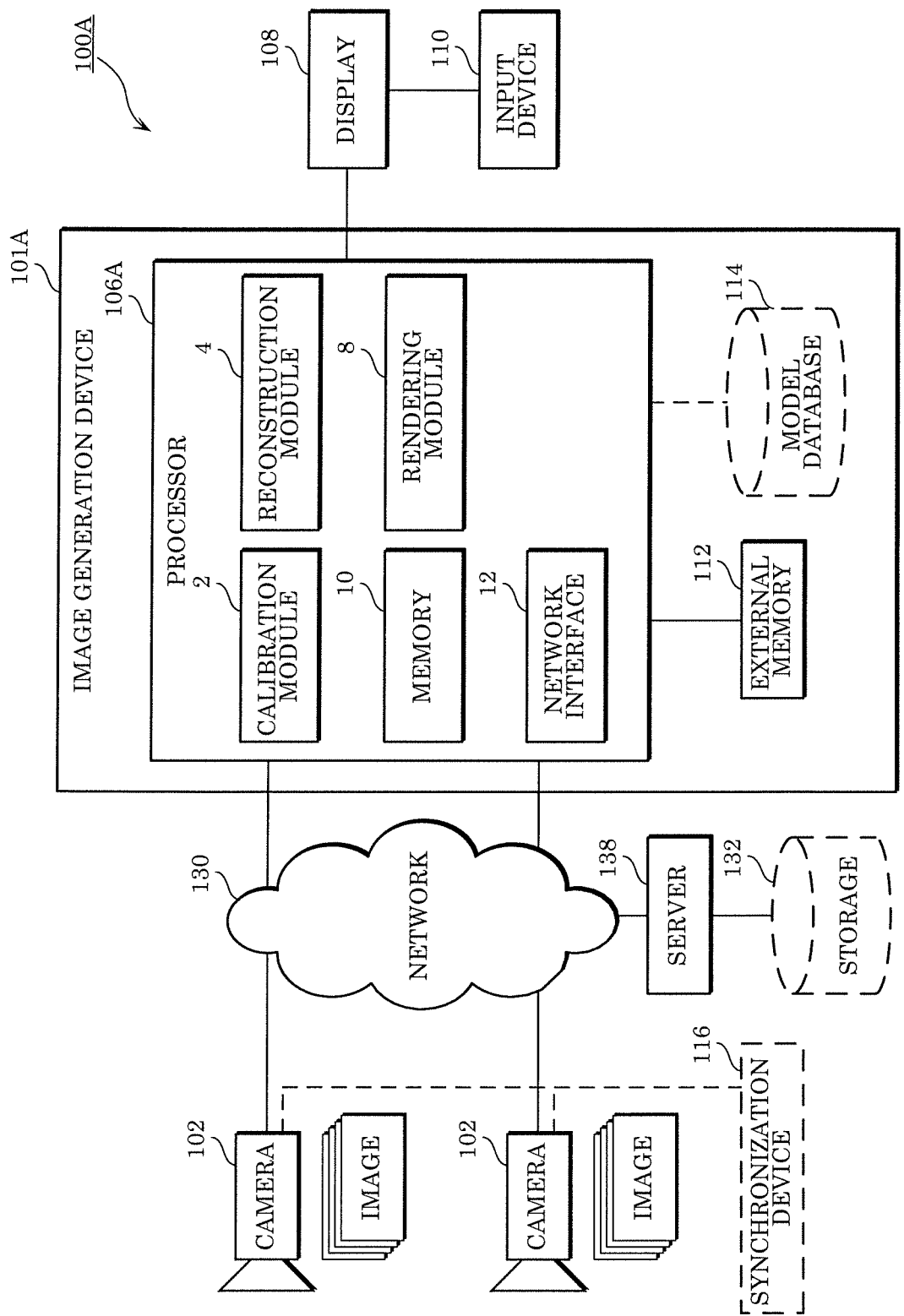
FIG. 17 is a block diagram illustrating an example of the configuration of an image generation system according to a variation.

In the above embodiment, image generation system 100 is configured so that the plurality of images captured by the plurality of cameras 102 are output to image generation device 101 via the plurality of image-capturing devices 104, but this is not limiting. For example, it is possible to apply a configuration such as that of image generation system 100A illustrated in FIG. 17 in which the plurality of images captured by the plurality of cameras 102 are output to image generation device 101A via network 130. In this case, the plurality of images may be temporarily accumulated in storage 132 of server 138 via network 130. Image generation device 101A may be configured to obtain, via network interface 12 of processor 106A, the plurality of images accumulated in storage 132 of server 138.

Such view-dependent synthesis is useful in a wide range of applications including the medical industry, the film industry, the video game industry, the building industry, the scientific community and the engineering community.

The above-described view-dependent synthesis requires practical rendering and high image quality that minimize visual discomfort. Furthermore, a method for handling visibility, occlusion, and a difference in color or luminance is needed.

Although the present disclosure is described based on the above embodiment, it goes without saying that the present disclosure is not limited to the above embodiment. The following cases are also included in the present disclosure.

(1) The respective devices described above may be specifically configured as a computer system made up of a microprocessor, a read only memory (ROM), a random access memory (RAM), a hard disk unit, a display unit, a keyboard, a mouse, and so on. A computer program is stored in the RAM or the hard disk unit. The respective devices achieve their functions by way of the microprocessor operating according to the computer program. Here, the computer program is configured of a combination of a plurality of command codes indicating instructions to a computer in order to achieve a predetermined function.

(2) Some or all of the structural elements included in each of the above-described devices may be one system LSI (Large Scale Integration: large scale integrated circuit). The system LSI is a super multifunctional LSI manufactured by integrating a plurality of components onto a signal chip. Specifically, the system LSI is a computer system configured of a microprocessor, a ROM, a RAM, and so on. A computer program is stored in the ROM. The system LSI achieves its function by way of the microprocessor loading the computer program from the ROM into the RAM and performing operations such as calculations according to the computer program.

(3) Some or all of the structural elements included in each of the above-described devices may be implemented as a standalone module or an IC card that can be inserted into and removed from the corresponding device. The IC card or the module is a computer system made up of a microprocessor, a ROM, a RAM, and so on. The IC card or the module may include the aforementioned super multifunctional LSI. The IC card or the module achieves its functions by way of the microprocessor operating according to the computer program. The IC card and the module may be tamperproof.

(4) The present disclosure may be implemented as the above-described methods. Furthermore, the present disclosure may be implemented as a computer program for implementing these methods using a computer or may be a digital signal of the computer program.

Furthermore, the present disclosure may be implemented as a computer program or a digital signal recorded on a computer-readable recording medium, such as a flexible disk, a hard disk, a compact disc (CD-ROM), a magneto-optical disc (MO), a digital versatile disc (DVD), DVD-ROM, DVD-RAM, a Blu-ray (registered trademark) disc (BD), or a semiconductor memory, for example. The present disclosure may also be implemented as a digital signal recorded on the aforementioned recoding media.

Furthermore, in the present disclosure, the computer program or the digital signal may be transmitted via an electrical communication line, a wireless or wired communication line, a network represented by the Internet, data broadcasting, or the like.

Furthermore, the present disclosure may be a computer system including a microprocessor and a memory. The memory may store the computer program and the microprocessor may operate according to the computer program.

Moreover, by transferring the recording medium having the program or the digital signal recorded thereon or by transferring the program or the digital signal via the network or the like, the present disclosure may be implemented by a different independent computer system.

(5) The above embodiment and the above variation may be combined with each other.

Note that in the above embodiment, each of the structural elements may be configured in the form of an exclusive hardware product or may be implemented by executing a software program suitable for the structural element. Each of the structural elements may be implemented by a program executing unit such as a central processing unit (CPU) or a processor reading and executing the software program recorded on a recording medium such as a hard disk or a semiconductor memory. Here, software for realizing the 3D reconstruction method and the 3D reconstruction device, etc., according to the above embodiment is a program described below.

Specifically, this program causes a computer to execute a reconstruction method for reconstructing a three-dimensional (3D) model using a plurality of two-dimensional (2D) images obtained by a plurality of cameras disposed in different positions and attitudes capturing a same target space in a 3D space. The reconstruction method includes: converting the plurality of 2D images into a plurality of first low-resolution images having a resolution lower than a resolution of the plurality of 2D images; reconstructing, using the plurality of first low-resolution images, a first 3D point cloud including a plurality of 3D points; generating a second 3D point cloud including 3D points increased by adding a new 3D point to the first 3D point cloud using a plurality of high-resolution images obtained based on the plurality of 2D images and having a resolution higher than the resolution of the plurality of first low-resolution images; and reconstructing the 3D model using the second 3D point cloud.

Although the 3D reconstruction method and the 3D reconstruction device according to one or more aspects of the present disclosure have been described thus far based on the embodiment, the present disclosure is not limited to the above-described embodiment. Various modifications of the present embodiment as well as embodiments resulting from combinations of structural elements in different exemplary embodiments that may be conceived by a person having ordinary skill in the art are intended to be included within the scope of the present disclosure as long as these do not depart from the essence of the present disclosure.

What is claimed is:

1. A reconstruction method for reconstructing a three-dimensional (3D) model using a plurality of two-dimensional (2D) images obtained by a plurality of cameras disposed in different positions and attitudes capturing a same target space in a 3D space, the method comprising:
   converting the plurality of 2D images into a plurality of first low-resolution images, respectively, by lowering a resolution of each of the plurality of 2D images;
   converting a plurality of camera parameters of the plurality of cameras into a plurality of converted camera parameters, respectively, along with the conversion of the plurality of 2D images into the plurality of first low-resolution images;
   reconstructing a first 3D point cloud using the plurality of first low-resolution images and the plurality of converted camera parameters, the first 3D point cloud including a plurality of 3D points;
   generating a new 3D point by feature point matching using a plurality of high-resolution images obtained based on the plurality of 2D images and each having a resolution that is higher than a resolution of any of the plurality of first low-resolution images;
   generating a second 3D point cloud by adding the new 3D point generated to the first 3D point cloud; and
   reconstructing the 3D model using the second 3D point cloud.

2. The reconstruction method according to claim 1, further comprising:
   determining whether or not a predetermined condition is satisfied;
   when determining that the predetermined condition is not satisfied, repeating the following until the predetermined condition is satisfied:
     a process of converting the plurality of 2D images into a plurality of second low-resolution images having a resolution different from the resolution of the plurality of first low-resolution images obtained in a last round of conversion; and
     a process of reconstructing a first 3D point cloud including a plurality of 3D points using the plurality of second low-resolution images; and
   in the generating of the second 3D point cloud, the second 3D point cloud including 3D points increased by adding the new 3D point to the first 3D point cloud generated as a result of the repeating until the predetermined condition is satisfied is generated.

3. The reconstruction method according to claim 2, wherein
   the plurality of second low-resolution images obtained in the conversion that is repeated has a resolution higher than the resolution of the plurality of first low-resolution images.

4. The reconstruction method according to claim 2, wherein
   the predetermined condition is that a total number of 3D points included in an obtained 3D point cloud exceeds a predetermined number.

5. The reconstruction method according to claim 1, wherein
   in the generating of the new 3D point, the new 3D point is generated by feature point matching using an empty pixel which is a pixel that does not correspond to the plurality of 3D points included in the first 3D point cloud, among pixels of the plurality of high-resolution images.

6. A reconstruction device, comprising:
   a processor which reconstructs a three-dimensional (3D) model using a plurality of two-dimensional (2D) images obtained by a plurality of cameras disposed in different positions and attitudes capturing a same target space in a 3D space, wherein
   the processor performs operations including:
   converting the plurality of 2D images into a plurality of first low-resolution images, respectively, by lowering a resolution of each of the plurality of 2D images;
   converting a plurality of camera parameters of the plurality of cameras into a plurality of converted camera parameters, respectively, along with the conversion of the plurality of 2D images into the plurality of first low-resolution images;
   reconstructing a first 3D point cloud using the plurality of first low-resolution images and the plurality of converted camera parameters, the first 3D point cloud including a plurality of 3D points;
   generating a new 3D point by feature point matching using a plurality of high-resolution images obtained based on the plurality of 2D images and each having a resolution that is higher than a resolution of any of the plurality of first low-resolution images;
   generating a second 3D point cloud by adding the new 3D point generated to the first 3D point cloud; and
   reconstructing the 3D model using the second 3D point cloud.

7. The reconstruction device according to claim 6, wherein
   in the generating of the new 3D point, the new 3D point is generated by feature point matching using an empty pixel which is a pixel that does not correspond to the plurality of 3D points included in the first 3D point cloud, among pixels of the plurality of high-resolution images.

8. A generation method, comprising:
   obtaining two-dimensional (2D) images generated by photographing a space from different viewpoints with at least one camera;
   reducing resolutions of each of the 2D images to generate first images, respectively;
   generating second images from each of the 2D images, respectively such that a resolution of each of the second images is higher than a resolution of any one of the first images;
   generating first three-dimensional (3D) points based on the first images and a plurality of camera parameters from the at least one camera, the first 3D points indicating respective first positions in the space;
   generating a new 3D point by feature point matching based on the second images, the new 3D point indicating a second position in the space;
   generating second 3D points by adding the new 3D point generated to the first 3D points; and
   generating a 3D model of the space based on the second 3D points.

9. The generation method according to claim 8, wherein
   in the generating of the new 3D point, the new 3D point is generated by feature point matching using an empty pixel which is a pixel that does not correspond to the first 3D points, among pixels of the second images.

* * * * *